(12) United States Patent
Dhoolia et al.

(10) Patent No.: US 8,620,820 B2
(45) Date of Patent: *Dec. 31, 2013

(54) MANAGEMENT OF DYNAMIC ASSEMBLY AND LICENSING OF APPLIANCES

(75) Inventors: Pankaj Dhoolia, New Delhi (IN); Debdoot Mukherjee, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,698

(22) Filed: Nov. 15, 2011

(65) Prior Publication Data

US 2013/0124352 A1  May 16, 2013

(51) Int. Cl.
*G06Q 99/00* (2006.01)

(52) U.S. Cl.
USPC .................................... 705/59; 705/26.1

(58) Field of Classification Search
USPC .................................. 705/26.1, 29
See application file for complete search history.

(56) References Cited

U.S. PATENT DOCUMENTS

| | | | | |
|---|---|---|---|---|
| 8,380,837 | B2 * | 2/2013 | Dawson et al. | 709/223 |
| 8,458,717 | B1 * | 6/2013 | Keagy et al. | 718/104 |
| 2009/0276771 | A1 * | 11/2009 | Nickolov et al. | 717/177 |
| 2009/0300149 | A1 | 12/2009 | Ferris et al. | |
| 2009/0300151 | A1 | 12/2009 | Friedman et al. | |
| 2009/0327471 | A1 * | 12/2009 | Astete et al. | 709/223 |
| 2010/0332617 | A1 | 12/2010 | Goodwin et al. | |
| 2011/0072431 | A1 | 3/2011 | Cable et al. | |
| 2011/0072522 | A1 | 3/2011 | Koka et al. | |
| 2011/0162062 | A1 | 6/2011 | Kumar et al. | |
| 2012/0059917 | A1 * | 3/2012 | Dawson et al. | 709/223 |
| 2013/0144744 | A1 * | 6/2013 | Astete et al. | 705/26.1 |

OTHER PUBLICATIONS

Wei, Jinpeng. et al., "Managing Security of Virtual Machine Images in a Cloud Environment". CCSW '09, Proceedings of the 2009 ACM Workshop on Cloud Computing Security, Nov. 13, 2009, 6 pages, Chicago, Illinois, USA.

Zhang, Liang-Jie, et al., "CCOA: Cloud Computing Open Architecture", 2009 IEEE International Conference on Web Services, Jul. 6-10, 2009, pp. 607-616, Los Angeles, California, USA.

* cited by examiner

*Primary Examiner* — James D Nigh
(74) *Attorney, Agent, or Firm* — Ference & Associates LLC

(57) ABSTRACT

Methods and arrangements for assembly and licensing of appliances. A base image is created, the base image corresponding to a combination of an operating system and hardware. A purchasing medium client is embedded into the base image, and a provisioning request for a pay-per-use license is developed. A provisioned instance is started, and a product bundle plan is executed. The license is requested from a purchasing medium.

25 Claims, 7 Drawing Sheets

MANAGEMENT OF DYNAMIC ASSEMBLY AND LICENSING OF APPLIANCES

BACKGROUND

Tendencies have arisen in the information technology (IT) industries to cut back on many forms of operational expenditure. Especially in the case of large companies with massive, geographically distributed workforces, significant costs have been apparent in IT support, subpar utilization of hardware resources, and suboptimal management of software licenses. If productivity increases are sought via equipping personnel with up-to-date developer toolsets, costly advanced hardware configurations are usually required for running them effectively.

BRIEF SUMMARY

In summary, one aspect of the invention provides a method comprising: creating a base image, the base image corresponding to a combination of an operating system and hardware; embedding a purchasing medium client into the base image; developing a provisioning request for a pay-per-use license; starting a provisioned instance; executing a product bundle plan; and requesting the license from a purchasing medium.

Another aspect of the invention provides an apparatus comprising: at least one processor; and a computer readable storage medium having computer readable program code embodied therewith and executable by the at least one processor, the computer readable program code comprising: computer readable program code configured to create a base image, the base image corresponding to a combination of an operating system and hardware; computer readable program code configured to embed a purchasing medium client into the base image; computer readable program code configured to develop a provisioning request for a pay-per-use license; computer readable program code configured to start a provisioned instance; computer readable program code configured to execute a product bundle plan; and computer readable program code configured to request the license from a purchasing medium.

An additional aspect of the invention provides a computer program product comprising: a computer readable storage medium having computer readable program code embodied therewith, the computer readable program code comprising: computer readable program code configured to create a base image, the base image corresponding to a combination of an operating system and hardware; computer readable program code configured to embed a purchasing medium client into the base image; computer readable program code configured to develop a provisioning request for a pay-per-use license; computer readable program code configured to start a provisioned instance; computer readable program code configured to execute a product bundle plan; and computer readable program code configured to request the license from a purchasing medium.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
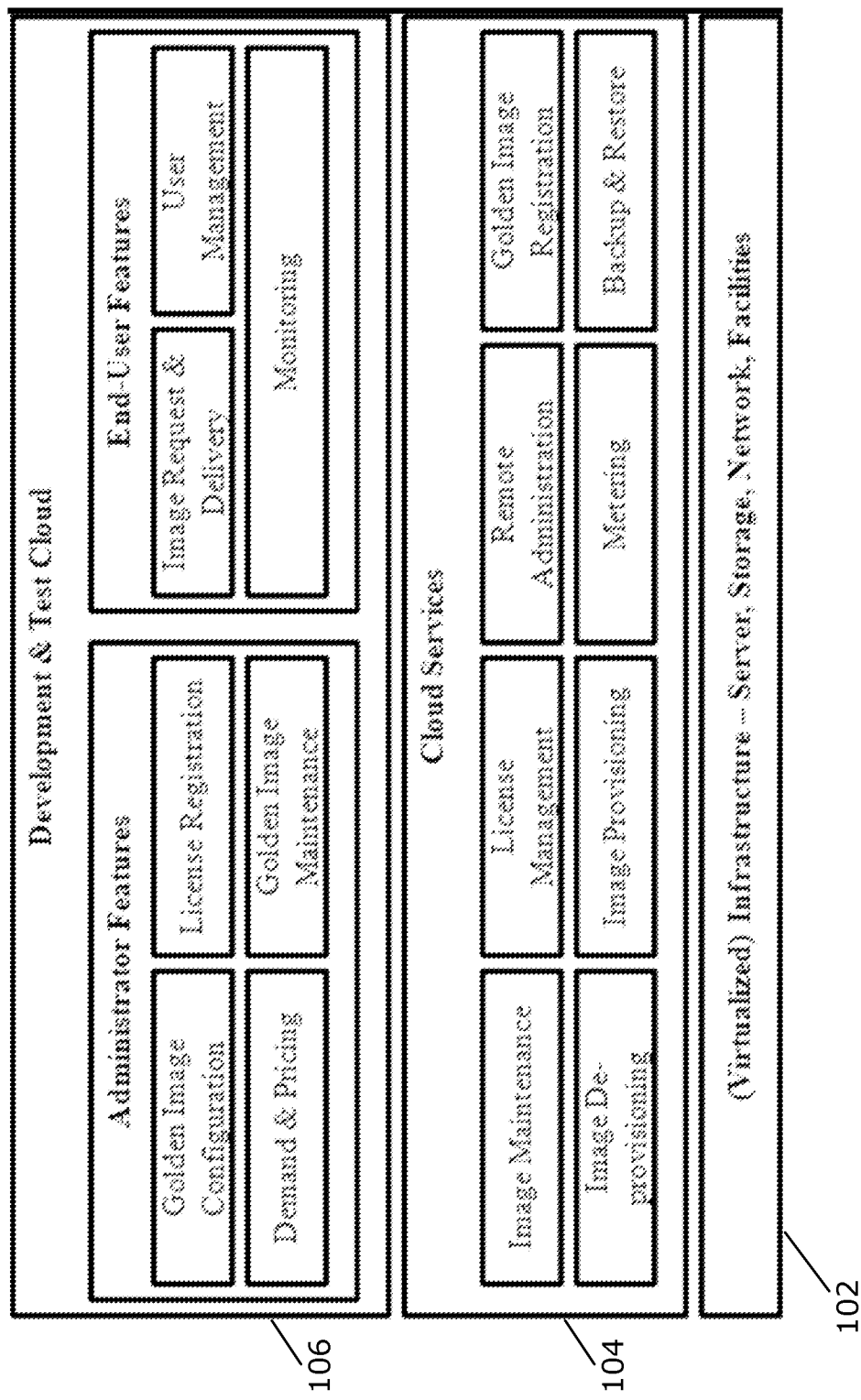
FIG. 1 schematically illustrates a layered architecture for a development test cloud.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
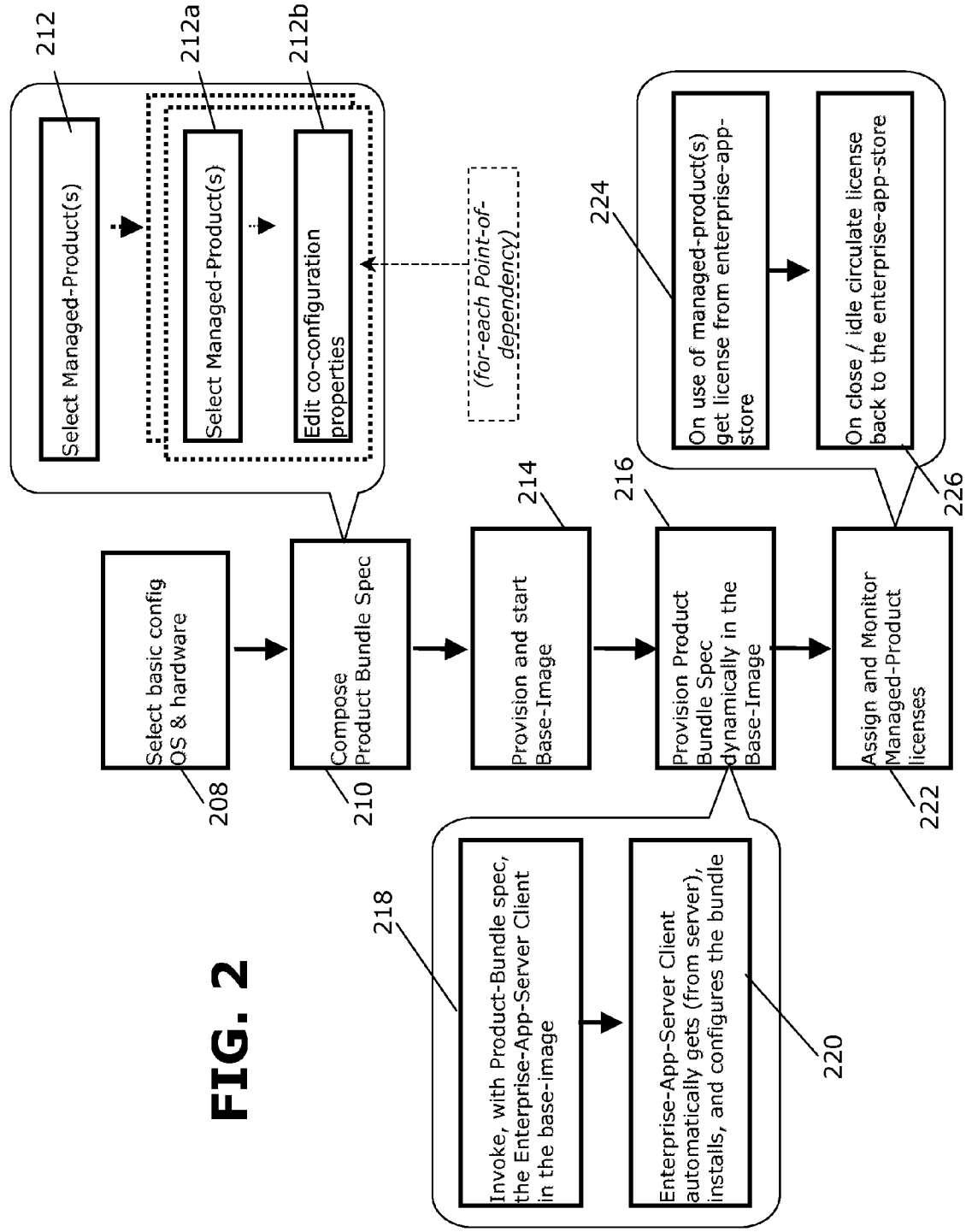
FIG. 2 schematically depicts a process of license provisioning.
Figure 3:
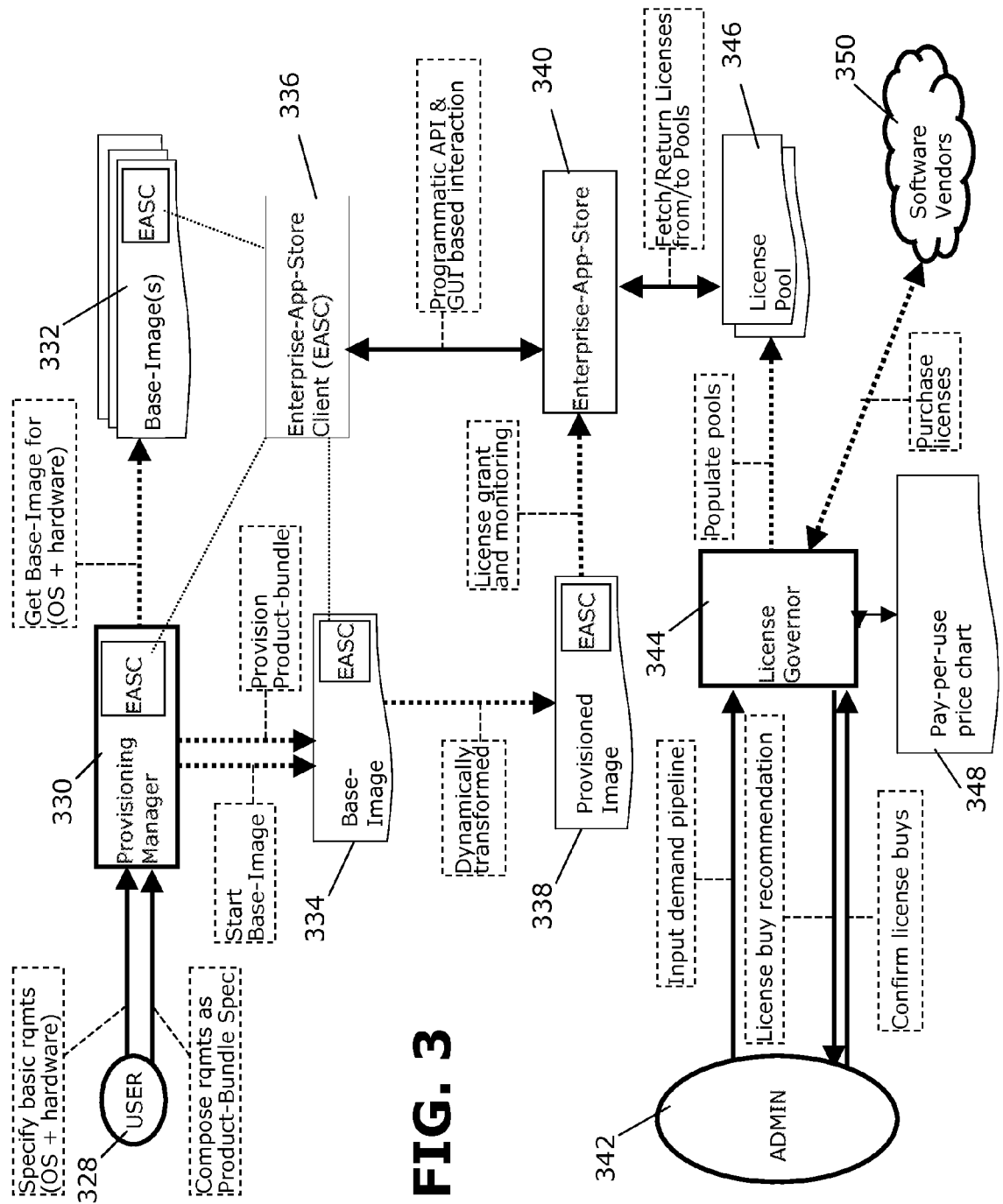
FIG. 3 schematically depicts a system for license provisioning.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

In accordance with at least one embodiment of the invention, there is broadly contemplated herein the use of a cloud based service delivery environment to address challenges such as those stated heretofore. By using a cloud for hosting development and test environments, not only can IT infrastructure and support costs be reduced drastically, but delivery can be streamlined significantly by provisioning pre-configured, standardized toolsets. Significant improvements in developer productivity are thereupon likely to result. Moreover, lines-of-businesses (LOBs) can be empowered in an enterprise with extreme agility to contend changing market realities; for instance, they can easily scale up or scale down their IT infrastructure because they do not incur any capital expenditure to own hardware or software but simply pay a price based on usage.

Generally, IT services enterprises have used a cloud only for hosting applications that serve their clients. While such systems can help simplify application development, they do not allow the flexibility of defining various details of application architecture. Often, out-of-box configurations do not work when one builds complex, scalable enterprise applications. On the other hand, popular enterprise-strength development tools continue to be available only under perpetual licenses and are considered exclusively for on-premise deployment.

On the other hand, a "development & test cloud" (DTC) emerges, in the context of at least one embodiment of the invention, as a unique offering specifically designed to ensure that application development and maintenance activities can move to the cloud. Generally, a DTC is a service environment that can automatically provision pre-configured, integrated sets of software on hardware configurations chosen by the user. It can turn-around defect-free, ready-to-use development and testing environments within minutes, thus resulting in faster time-to-market of deliverables as well as lower idle times for project personnel.

Generally, it has been observed that conventional models of software licensing are entirely incompatible with cloud computing environments, thereby presenting a significant roadblock to greater cloud adoption. By significant contrast, in accordance with at least one embodiment of the invention, there is broadly contemplated herein a service model in which a DTC vendor purchases all software licenses and recovers the cost from its clients based on their period of usage. A model as broadly contemplated herein allows the vendor to maximize returns from a purchased license by using it in multiple projects separated in time.

Generally, in the context of at least one embodiment of the invention, it should be understood that a DTC can provision, on-demand, pre-configured virtual machine (VM) images of standardized tool-sets on a high-performing cloud infrastructure. Herebelow, there are introduced basic use-cases of a DTC, a review of a conceivable technical architecture and an articulation of the value that a DTC brings to IT service enterprises engaging in application development and maintenance.

In the context of at least one embodiment of the invention, an "appliance", as broadly understood herein, represents a common set of software that, when installed and tuned to a given configuration, can support development and testing activities across service engagements of a particular type. An appliance may contain both desktop-side and server-side software.

In the context of at least one embodiment of the invention, the prominent use-cases of a DTC may be summarized as the registration and management of appliances, and the on-demand provisioning of instance of appliances. In the former case, administrative users register appliances on DTC by supplying a set of "golden images" that manifest the desired configuration of all software present in an appliance. They also need to register licenses for these software and update relevant pricing information. Configurations of golden images can be updated at any time. In the on-demand provisioning of instances of appliances, customers of a DTC can order instances of appliances on-demand. The instantiation of images with a standardized configuration of software present in the registered golden images can usually completed in a time frame of about 10 to 15 minutes.

In accordance with a context of at least one embodiment of the invention, a layered architecture for a DTC as shown in FIG. 1 can be employed; this architecture, by way of a merely illustrative and non-restrictive example, strikes a close parallel to the Cloud Computing Open Architecture (CCOA) disclosed in L. Zhang and Q. Zhou, "CCOA: Cloud computing open architecture" (2009 *IEEE International Conference on Web Services*, pp. 607-616. IEEE, 2009). By way of non-restrictive illustration and example, the lowest layer in FIG. 1 (102) directly maps to the CCOA layer of "Virtualization: Hardware & Software". The Cloud Services layer (104) can correspond to an instantiation of two layers in CCOA, "Cloud Core" and "Service Orientation", and abstracts key interfaces with the cloud infrastructure in terms of services. Some important associated services can include, but need not be limited to: registering golden images, provisioning and de-provisioning images with a registered golden image, assigning patches for golden images, assigning licenses to different software in the provisioned images, remotely performing routine administration (e.g., restart, shutdown), metering usage of provisioned images, and providing back-up and restore facilities for images. Finally, the (top) DTC layer (106) can correspond to a value-added "Cloud Offering" as per CCOA, which leverages standard cloud services and adds supplementary functionalities.

In accordance with a context of at least one embodiment of the invention, a DTC environment can help with LOB's in service organizations in a manner to heavily cut down on capital expenditure and operational costs, as well as improve operational efficiency. Herebelow, some salient features of a DTC are set forth along with benefits derived from each characteristic.

In accordance with a context of at least one embodiment of the invention, one feature of a DTC is the instant provisioning of pre-configured images. Essentially, a DTC can significantly reduce IT labor costs to install and configure development and testing environments. As such, complex development environments involve installation of considerable software and appropriate configurations to ensure that the tools work together. Often, the total effort expended in such work can be around 1-2 person-weeks. With a DTC, one can provision ready-to-use development environments within a few minutes. Again, significant time is expended to duplicate the configuration of a development environment each time a new developer is on-boarded in a project. Today, such overheads can add up to severely retard delivery schedules, especially in large projects involving hundreds of developers. Thus, a DTC can also drive faster time-to-market and reduce the risk of schedule over-run.

In accordance with a context of at least one embodiment of the invention, another feature of a DTC is pay-as-you-go pricing. Essentially, a pay-per-use scheme makes it easier for IT service enterprises to scale up and scale down different LOB's based on market realities, since the LOBs need not make any upfront capital investment to meet their IT requirements.

In accordance with a context of at least one embodiment of the invention, yet another feature of a DTC is standardized configurations and processes. Basically, a DTC can eliminate defects that arise from faulty configurations of development tool-sets by always provisioning standardized, perfected configurations. Furthermore, a centralized delivery platform like a DTC can ease roll-out and enforcement of standard delivery processes related to work distribution and release and change management, as well as other processes.

In accordance with a context of at least one embodiment of the invention, still another feature of a DTC is its use as a high-performing cloud infrastructure. Generally, since clouds virtualize computing environments on high performance servers, the virtual machines provisioned by a DTC have greater computational power than usual developer desktops. Thus, developer and testers can seamlessly use richer tool sets that often require advanced machine configurations. Of course, an enterprise can enjoy the usual benefits of a cloud such as increased server utilization, increased self-service opportunities, freed-up floor space and improved monitoring of infrastructure usage.

The disclosure now turns to a DTC service model, in accordance with at least one embodiment of the invention, that addresses an issue of purchasing software licenses. Particularly, the purchase of software licenses has emerged as an impediment to efficient functioning of conventional DTC service models, and broadly contemplated herein are methods and arrangements that help circumvent such an impediment. As such, conventional DTC models require customers to purchase licenses upfront for most software. Clearly, in such a scenario, the promises of lower software costs and easier scaling of usage levels will not be realized, as the licenses have to be purchased at the same rates as they are available for lifelong standalone use. Hence, this typically inhibits broader adoption and use of DTC's. Reference is made herebelow to four Equations, numbered (1) through (4); the Equations are provided in the Appendix herein.

In accordance with at least one embodiment of the invention, a DTC provider purchases licenses and end-users merely end up paying a just fee based on the actual, limited usage involved. To this end, it is broadly contemplated herein for a DTC provider to purchase licenses of different kinds of software and collect the same in license pools. A fee is ascertained for using licenses from the pool for some unit of time (e.g., a day, week or month). Further, every time an appliance is provisioned for a DTC project, each software in the appliance is associated with an unassigned license coming from the pool of licenses for that software in the DTC. The fees for using the different licenses is bundled into the appliance cost (including other charges for hardware and support. The user may then be requested to pay a premium price (higher than the fixed rate, possibly close to the actual license cost) only if there are no licenses available in the pool for a particular software.

Further, in accordance with at least one embodiment of the invention, the licenses are returned back to the pool after the appliances get deprovisioned. Accordingly, broadly contemplated herein is a service model that can enable DTC providers to operate profitably by indicating the optimal number of licenses to purchase and also come up with suitable prices for the same. This can permit a DTC vendor to keep just enough licenses in the pool to serve demand for appliances at any point of time. Also, the service model can ensure that a license, once purchased, finds use in several projects over the course of time. Greater license reuse across projects separated in time will bring down the fees paid by the end-user and enhance the DTC vendor's profitability.

In accordance with at least one embodiment of the invention, a question addressed is that of assisting a DTC enterprise in effectively investing a fixed amount of capital to buy licenses of software present in common appliances and then appropriately pricing the appliances in a pay-per-use model, based on available demand forecasts. At first sight, one may relate this problem to a standard problem of inventory management. For purposes as broadly contemplated herein, it can be assumed that an order for a new license is served instantaneously and thus, shortage costs are not applicable.

However, in accordance with at least one embodiment of the invention, in recognizing that a strategy of purchasing licenses every time a provisioning request arrives may not be optimal on its face, there is broadly contemplated herein the reuse of licenses for the sake of increasing profitability, thus compelling an investment in purchasing only those licenses for which sufficient future demand is expected. Again, buying licenses in advance may help save money if price increases are common. Thus, broadly contemplated herein is an optimization problem set up to determine the number of licenses of each kind of software that should be purchased in order to maximize the return on investment for the DTC vendor. Solving such a problem also helps us ascertain the price that can be set for each appliance or software usage per unit time.

Let there be considered here a finite set, $A=\{\alpha_1, \alpha_2, \ldots \alpha_n\}$ composed of appliances that are sought after in typical service engagements. An appliance can be represented by a set of software, $\alpha_i=\{S_1, S_2, \ldots S_m\}$ with pre-built configurations commonly used in a particular form of engagement. It can be assumed that engagements using a certain appliance, $\alpha_i$, have similar duration. If not, new appliances are created in A such that there is an enforcement of a small standard deviation of durations of all projects using a single appliance. Furthermore, it can be conjectured that solutioning teams in service enterprises have engagement pipeline data in their possession, which gives demand forecasts for each engagement type. Essentially, the pipeline data are constituted by a timewise plot of expected sales opportunities for every type of engagement considered, and essentially any suitable method for collecting and maintaining such data may be employed.

In accordance with at least one embodiment of the invention, a service model works with the following inputs:

$\Delta_i$: Mean project duration of engagements using a
$D_i$: Demand for $\alpha_i$ as a function of time
T: Time period for which all price calculations are made
F: Capital that may be invested in license purchase during time interval [0, T]

In accordance with at least one embodiment of the invention, there is introduced the notion of a license unit for an appliance. One license unit for $\alpha_i$ includes one license each for every software $S_j$ contained in it. Again, in the illustrative model here, time t can take up discrete values in the time interval [0, T]. In practice, a time period T of a quarter or a year may be discretized in terms of the different weeks or months in them. Suppose, $\chi_i$: Number of license units of $\alpha_i$ purchased at t=0

$L_i(t)$: Number of license units of $\alpha_i$ available in pool at time t $U_i(t)$: Number of license units of $\alpha_i$ taken out of pool for use in projects starting at time t As mentioned before, at any point of time, license units move out from the pool and get assigned to projects. Again, the license pool gets augmented by licenses from projects that have just ended. Thus, one can write Equation (1). (See this and other numbered equations in the Appendix herein.) Solving the recurrence relation of Equation (1), there is then yielded Equation (2).

In accordance with at least one embodiment of the invention, license units for an appliance are assigned only if there is demand for that appliance and there exist free units in its pool. Therefore, Equation (3) results. The cost $C_i$ of a license unit for appliance $\alpha_i$ is calculated as sum of license prices for each software $S_j \epsilon \alpha_i$. Thence, it can be recognized that the returns derived by the DTC each time an appliance is used in a project are directly proportional to the cost of the appliance. An optimization problem is thus formed (Equation 4) that seeks to maximize such returns. The constraints are as follows: license purchases are limited to as many units as are permitted by the available capital, F; and both demand and unassigned license units are assumed to exist.

As such, in accordance with at least one embodiment of the invention, the optimization problem of Equation (4) contains n(T+1) variables; where n is the number of appliances and T is the upper limit of the discrete time interval that is considered. For example, the variables for $\alpha_i$ are: $\chi_i$, $U_i(1)$, $U_i(2), \ldots, U_i(t)$. All variables take up integer values only; so the problem is NP-complete like all integer programming problems.

In accordance with at least one embodiment of the invention, once the optimization problem in Equation (4) is solved, there can be ascertained a price for using an appliance per unit time. This is computed by amortizing the total costs spent on licenses and configuration over the period of time when instances of that appliance find use. Thus, Equation (5) is yielded to provide the price of $\alpha_i$ per unit time. Additionally, support charges may be bundled, if support is important.

Inasmuch as license pricing has been covered in detail hereinabove, the disclosure now turns to an in-depth discussion of systems and methods that maybe employed in accordance with at least one embodiment of the invention with regard to provisioning licenses.

In accordance with at least one embodiment of the invention, it can be appreciated that, in the context of cloud environments, particularly development and test clouds, setting up a development or test machine presents challenges of composite requirements, time, and license management. Conventional systems and methods attend to the challenges of composite requirements and time by setting up one such environment, creating and storing a virtual machine image from it, and provisioning repeated requirements for such an environment by creating replicas of that virtual machine (VM) image. On the other hand, license management issues tend to be considered as something external. Hence, node-locked licenses require separate node licenses for each replica of the VM.

Among the problems encountered with conventional systems, it tends to be the case that the totality of available software, applications, and their dependency choices and configurations, for development and test environments, is enormous. Thus, the number of statically configured template images may be large. Their maintenance, in presence of frequently updating software (e.g., a perpetual beta trend), may either be troublesome in itself or may well result in significant time expenditures for updating, after provisioning a replica based on a slightly older image. Also, when ignoring license management issues (from the process of template image creation and its subsequent replication during provisioning), sub-optimal software procurement results for the cloud vendor, which in turn leads to sub-optimal pricing offered to the user.

Accordingly, in accordance with at least one embodiment of the invention, and as schematically illustrated in FIG. 2, there is broadly contemplated herein the provisioning of new development and test environments, and the composition of new provisioning requests using a view of an enterprise app store client. For a basic operating system (OS), and in the context of a hardware combination for a provisioning request, a replica of a base image is created, including an OS and hardware combination. The provisioned instance is started and a product bundle plan, composed during the provisioning request creation, is executed using the enterprise app store client embedded into the base image, thereby dynamically provisioning the request. At this point the provisioned instance is ready for use. Thence, the enterprise app store is dynamically contacted for a license allocation for use when a managed product is used in the provisioned image and the time of use is monitored by the enterprise app store, thereby permitting a pay-per-use mode for managed software.

More particularly, as shown in FIG. 2, a basic OS and hardware configuration is selected (208). A product bundle spec. is then composed (210) via selecting managed products (212) wherein, for each point of dependency, managed products are selected (212a) and co-configuration properties are edited (212b). (As such, steps 212a and 212b may be considered to be part of a larger step 212 of configuring a product bundle.)

A base image is provisioned and started (214), and a product bundle spec is provisioned dynamically in the base image (216). For this latter step (216), an enterprise app server client is invoked in the base image with the product bundle spec. (218) and the enterprise app server client then obtains the bundle (from the enterprise app server), installs it and configures it, all automatically (220). Managed product licenses are then assigned and monitored (222); to this end, upon use of managed products, a license is obtained from the enterprise app store (224) and, upon idle or close, the license is circulated back to the enterprise app store (226).

FIG. 3 schematically depicts a system for license provisioning, in accordance with at least one embodiment of the invention. The system of FIG. 3 may carry out method steps as shown in the method of FIG. 2, and may be further understood and appreciated with respect to the discussion of FIG. 2 above as well as other discussion of systems and processes herein. A user 328 specifies basic OS and hardware requirements then composes the requirements as a product-bundle spec. Provisioning manager 330 gets a base image 332 for the OS and hardware from a base image repository, the base image 332 having the enterprise app store client (EASC) 336 embedded therein. The base image (as 334) is then started and the product-bundle provisioned and is dynamically transformed into a provisioned image 336, with the EASC 336 still embedded therein. Provisioned image 336 is then sent to enterprise app store 340 for license grant and monitoring.

In accordance with at least one embodiment of the invention, an administrator 342 interacts with a license governor 344 via: indicating input demand thereto; obtaining a license buy recommendation therefrom; and confirming at least one license buy thereto. License governor 344, for its part, consults a pay-per-use price chart 348, which can assist in providing recommendations to administrator 342. License governor 342 attends to purchasing a license from at least one software vendor 350 responsive to a buy recommendation, and then populates at least one license pool 346 with such licenses.

In accordance with at least one embodiment of the invention, a link between the processes described hereinabove relating to user 328 and administrator 342 occurs when enterprise app store 340 fetches and returns licenses to and from the at least one pool 346, responsive to demand from user 328. This facilitates the pay-per-use licensing described herethroughout.

Figure 4:
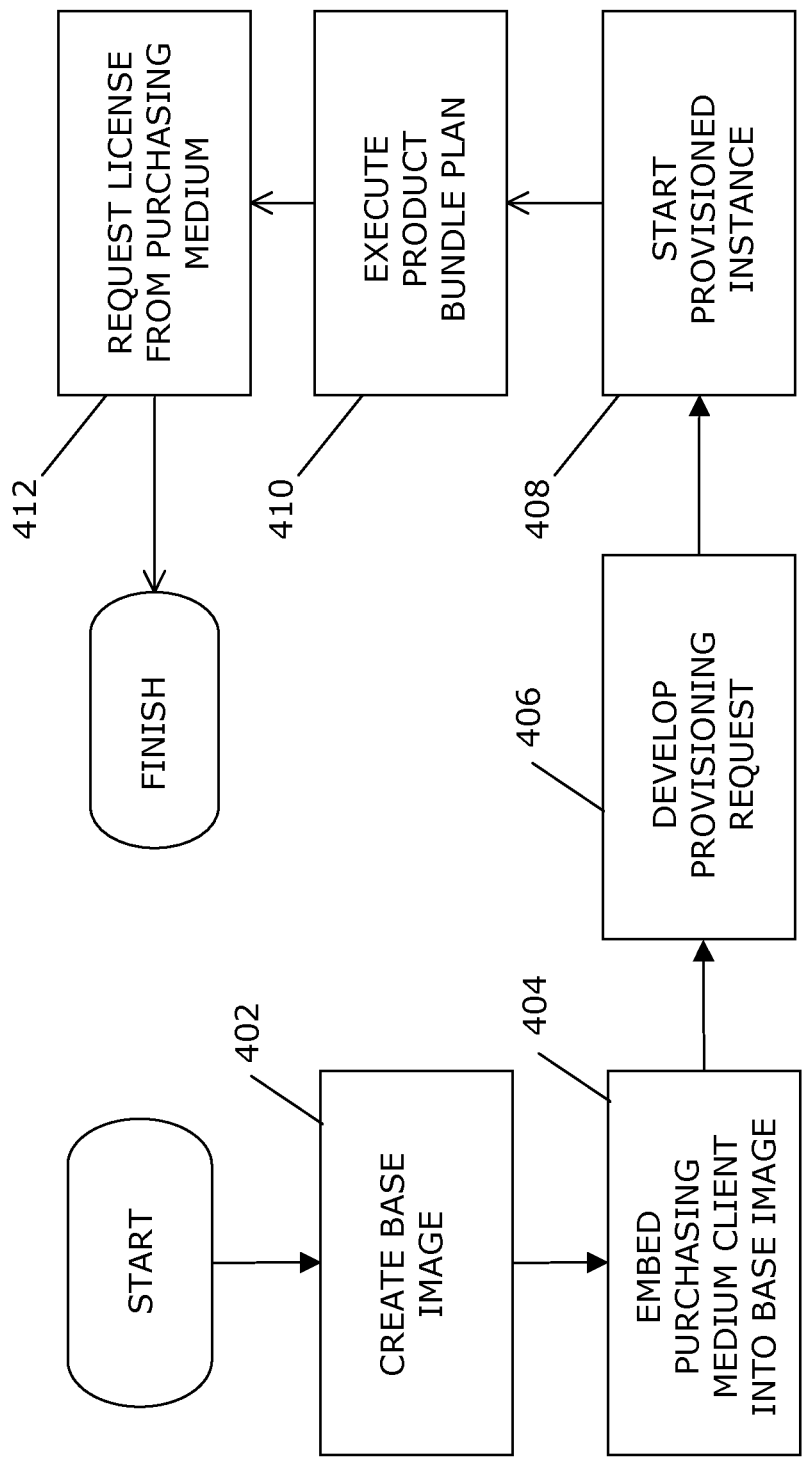
FIG. 4 sets forth a process more generally for assembly and licensing of appliances.

FIG. 4 sets forth a process more generally for assembling and licensing appliances, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, a base image is created (402), the base image corresponding to a combination of an operating system and hardware. A purchasing medium client is embedded into the base image (404), and a provisioning request for a pay-per-use license is developed (406). A provisioned instance is started (408), and a product bundle plan is executed (410). The license is requested from a purchasing medium (412).

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
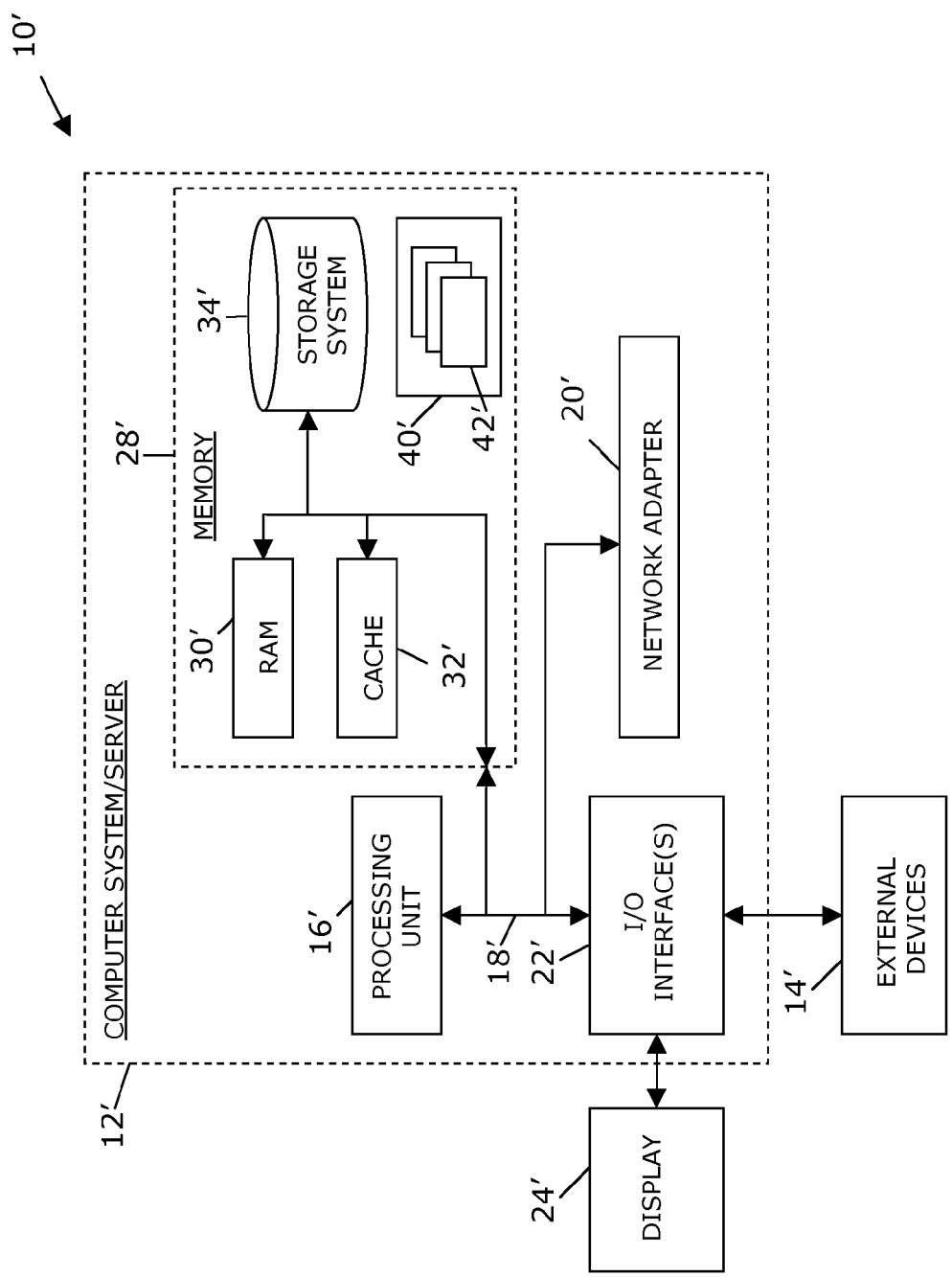
FIG. 5 depicts a cloud computing node.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove.

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

Figure 6:
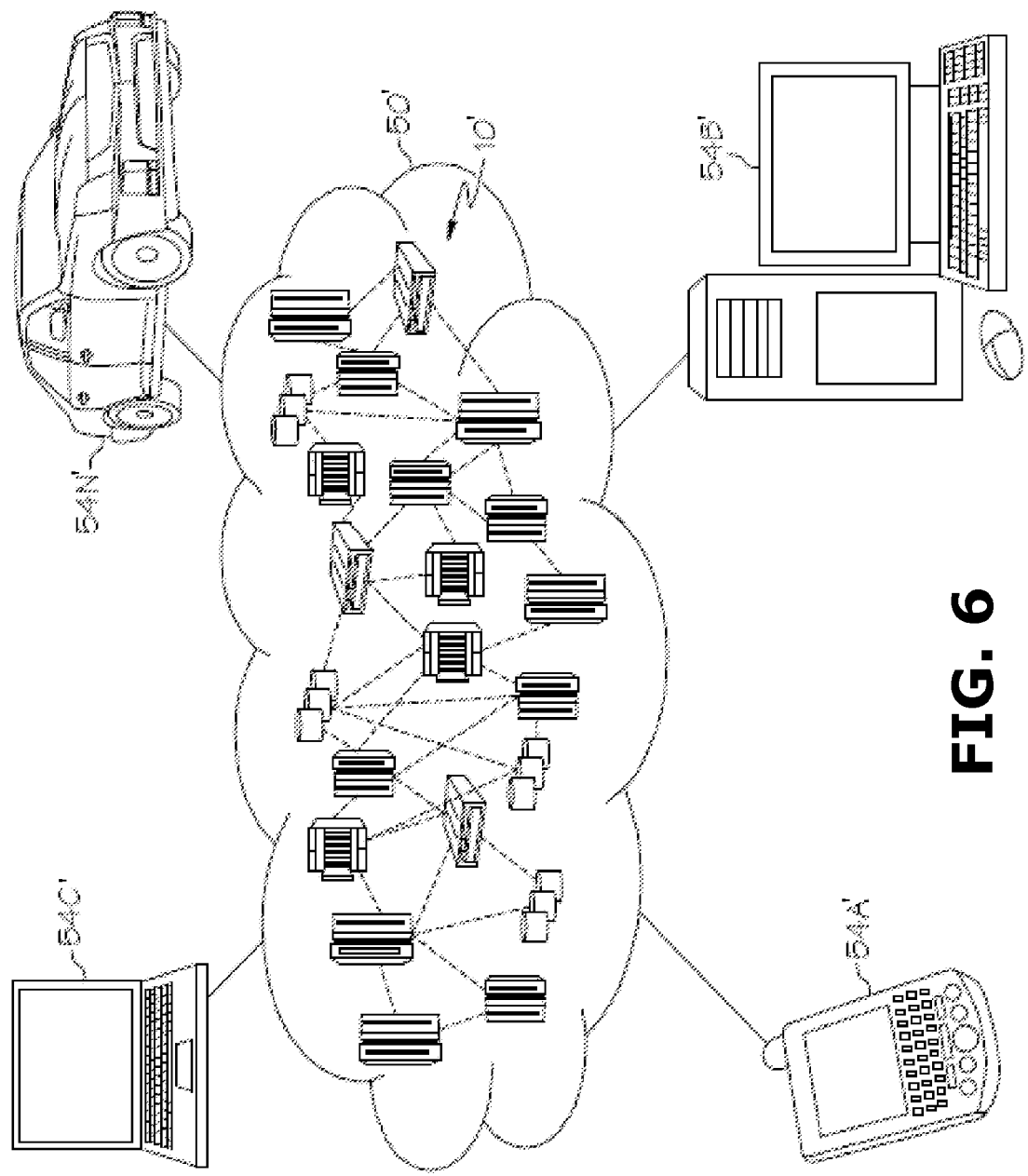
FIG. 6 depicts a cloud computing environment.

Referring now to FIG. 6, illustrative cloud computing environment 50' is depicted. As shown, cloud computing environment 50' comprises one or more cloud computing nodes 10' with which local computing devices used by cloud consumers, such as, for example, personal digital assistant (PDA) or cellular telephone 54A,' desktop computer 54B', laptop computer 54C', and/or automobile computer system 54N' may communicate. Nodes 10' may communicate with one another. They may be grouped (not shown) physically or virtually, in one or more networks, such as Private, Community, Public, or Hybrid clouds as described hereinabove, or a combination thereof. This allows cloud computing environment 50' to offer infrastructure, platforms and/or software as services for which a cloud consumer does not need to maintain resources on a local computing device. It is understood that the types of computing devices 54A'-N' shown in FIG. 2 are intended to be illustrative only and that computing nodes 10' and cloud computing environment 50' can communicate with any type of computerized device over any type of network and/or network addressable connection (e.g., using a web browser).

Figure 7:
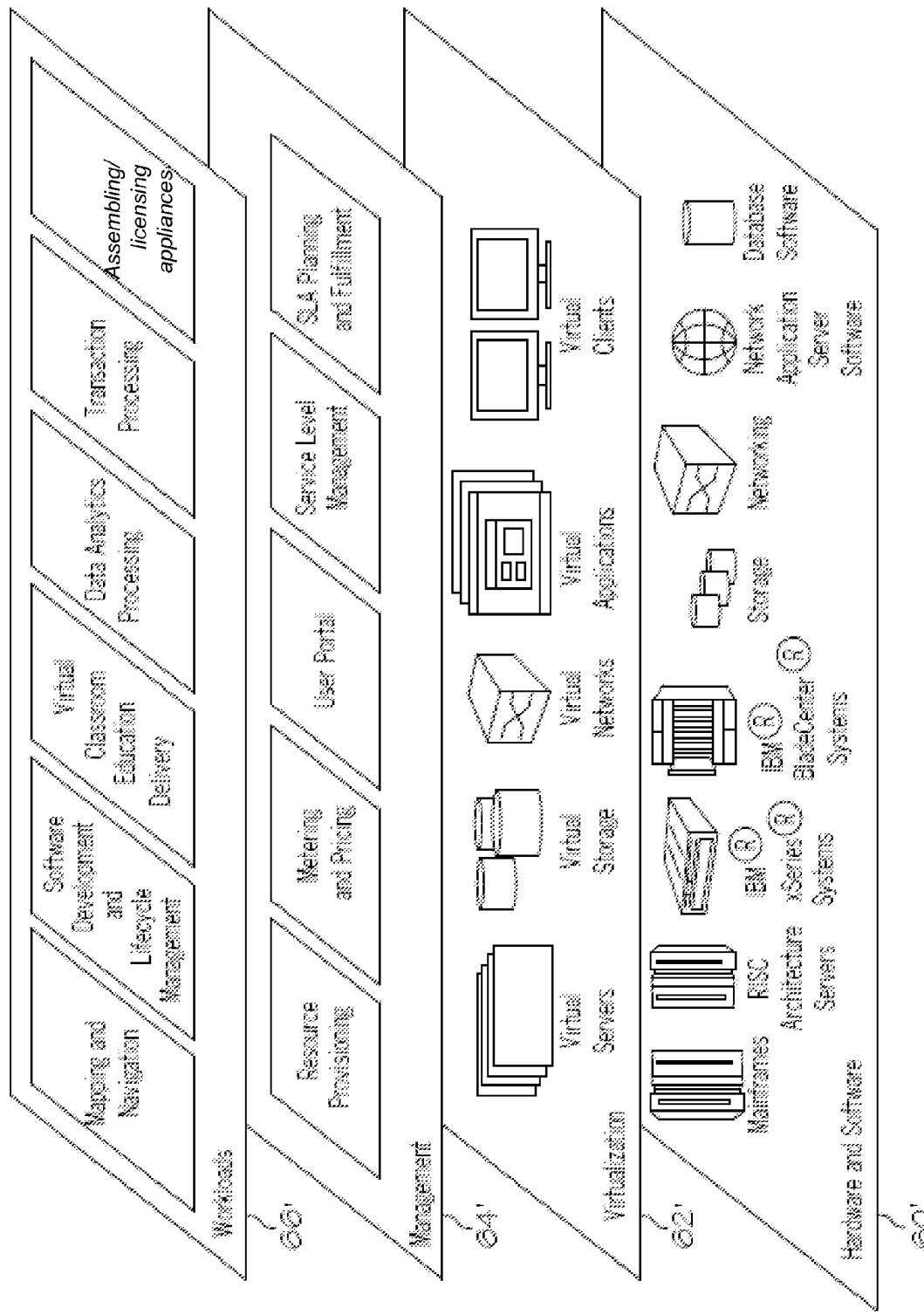
FIG. 7 depicts abstraction model layers.

Referring now to FIG. 7, a set of functional abstraction layers provided by cloud computing environment 50' (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60' includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62' provides an abstraction layer from which the following examples of virtual entities may be provided: virtual servers; virtual storage; virtual networks, including virtual private networks; virtual applications and operating systems; and virtual clients.

In one example, management layer 64' may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66' provides examples of functionality for which the cloud computing environment may be utilized. Examples of workloads and functions which may be provided from this layer include: mapping and navigation; software development and lifecycle management; virtual classroom education delivery; data analytics processing; transaction processing; and assembling and licensing appliances (e.g., as broadly contemplated herein in accordance with at least one embodiment of the invention).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

APPENDIX: EQUATIONS $$L_i(t+1) = \begin{cases} L_i(t) + U_i(t-\Delta_i) - U_i(t), & t \geq \Delta_i \\ L_i(t) - U_i(t), & 0 < t < \Delta_i \\ \chi_i, & t = 0 \end{cases} \quad (1)$$

$$L_i(t) = \begin{cases} \chi_i - \sum_{t'=t-\Delta_i}^{t-1} U_i(t'), & t \geq \Delta_i \\ \chi_i - \sum_{t'=0}^{t-1} U_i(t'), & 0 < t < \Delta_i \end{cases} \quad (2)$$

$$U_i(t) \leq \min[L_i(t), D_i(t)] \quad (3)$$

$$\max \quad \sum_{\forall i} C_i \sum_{t=1}^{T} U_i(t) \quad (4)$$

$$\text{s.t.} \quad \sum_{\forall i} C_i \chi_i \leq F$$

$$U_i(t) \leq L_i(t) \forall\ i, t \in \{1, 2, \ldots T\}$$

$$U_i(t) \leq D_i(t) \forall\ i, t \in \{1, 2, \ldots T\}$$

$$\text{Price of } \alpha_i \text{ per unit time} = \frac{\text{Configuration cost} + C_{i\chi_i}}{\Delta_i \sum_{i=1}^{T} U_i(t)} \quad (5)$$

What is claimed is:

1. An apparatus comprising:
at least one processor; and
a computer readable storage medium having computer readable program code embodied therewith and executable by the at least one processor, the computer readable program code comprising:
computer readable program code configured to create a base image, the base image corresponding to a combination of an operating system and hardware;
computer readable program code configured to embed a purchasing medium client into the base image, the purchasing medium client comprising an enterprise app store client;
computer readable program code configured to develop a provisioning request for a pay-per-use license;
computer readable program code configured to compose a product-bundle specification corresponding to the provisioning request, via selecting managed products and editing co-configuration properties;
computer readable program code configured to start a provisioned instance based on the composed product-bundle specification, wherein to start the provisioned instance comprises dynamically transforming the base image into a provisioned image;
computer readable program code configured to execute a product bundle plan based on the composed product-bundle specification;
computer readable program code configured to employ the enterprise app store client to interact with the enterprise app store to request and fetch the license from a purchasing medium, the purchasing medium comprising a license pool; and
computer readable program code configured to populate the license pool via:
receiving input demand;
recommending a license buy based on the input demand; and
confirming purchase of at least one license and adding the at least one license to the license pool.

2. A computer program product comprising:
a non-transitory computer readable storage medium having computer readable program code embodied therewith, the computer readable program code comprising:
computer readable program code configured to create a base image, the base image corresponding to a combination of an operating system and hardware;
computer readable program code configured to embed a purchasing medium client into the base image, the purchasing medium client comprising an enterprise app store client;
computer readable program code configured to develop a provisioning request for a pay-per-use license;
computer readable program code configured to compose a product-bundle specification corresponding to the provisioning request, via selecting managed products and editing co-configuration properties;
computer readable program code configured to start a provisioned instance based on the composed product-bundle specification, wherein to start the provisioned instance comprises dynamically transforming the base image into a provisioned image;
computer readable program code configured to execute a product bundle plan based on the composed product-bundle specification;
computer readable program code configured to employ the enterprise app store client to interact with the enterprise app store to request and fetch the license from a purchasing medium, the purchasing medium comprising a license pool; and
computer readable program code configured to populate the license pool via:
receiving input demand;
recommending a license buy based on the input demand; and
confirming purchase of at least one license and adding the at least one license to the license pool.

3. The computer program product according to claim 2, wherein said computer readable program code is configured to compose the product bundle plan.

4. The computer program product according to claim 3, wherein said computer readable program code is configured to execute the product bundle plan via employing the purchasing medium client.

5. The computer program product according to claim 4, wherein the purchasing medium comprises an enterprise app store.

6. The computer program product according to claim 2, wherein said computer readable program code is configured to request the license dynamically.

7. The computer program product according to claim 6, wherein said computer readable program code is configured to request the license responsive to a managed product being employed in the provisioned instance.

8. The computer program product according to claim 2, wherein said computer readable program code is further configured to request the license time of use of the license.

9. The computer program product according to claim 2, wherein the purchasing medium comprises an enterprise app store.

10. The computer program product according to claim 2, wherein said computer readable program code is further configured to undertake procurement, management, and pricing of licenses for at least one managed product and at least one product bundle.

11. The computer program product according to claim 2, wherein said computer readable program code is further configured to undertake procurement, distribution and pricing for at least one supported managed product.

12. The computer program product according to claim 2, wherein said computer readable program code is further configured to:
purchase a license and recovers cost based on a period of client usage, thus enabling pay-per-use pricing; and
reuse a license across different projects, wherein software usages are separated in time.

13. The computer program product according to claim 12, wherein said computer readable program code is further configured to:
amortize license cost recovery across different instances when a license is reused;
and manage procurement of a licenses based on forecasted demand for a project.

14. A method comprising:
utilizing at least one processor to execute computer code configured to perform the steps of:
creating a base image, the base image corresponding to a combination of an operating system and hardware;
embedding a purchasing medium client into the base image, the purchasing medium client comprising an enterprise app store client;
developing a provisioning request for a pay-per-use license;
composing a product-bundle specification corresponding to the provisioning request, via selecting managed products and editing co-configuration properties;
starting a provisioned instance based on the composed product-bundle specification, wherein said starting comprises dynamically transforming the base image into a provisioned image;
executing a product bundle plan based on the composed product-bundle specification;
employing the enterprise app store client to interact with an enterprise app store to request and fetch the license from a purchasing medium, the purchasing medium comprising a license pool; and
computer readable program code configured to populate the license pool via:
receiving input demand;
recommending a license buy based on the input demand; and
confirming purchase of at least one license and adding the at least one license to the license pool.

15. The method according to claim 14, wherein said developing comprises composing the product bundle plan.

16. The method according to claim 15, wherein said executing comprises employing the purchasing medium client.

17. The method according to claim 16, wherein the purchasing medium comprises an enterprise app store.

18. The method according to claim 14, wherein said requesting is performed dynamically.

19. The method according to claim 18, wherein said requesting is performed responsive to a managed product being employed in the provisioned instance.

20. The method according to claim 14, further comprising monitoring time of use of the license.

21. The method according to claim 14, wherein the purchasing medium comprises an enterprise app store.

22. The method according to claim 14, further comprising providing a license manager which undertakes procurement, management, and pricing of licenses for at least one managed product and at least one product bundle.

23. The method according to claim 14, further comprising providing a license manager which undertakes procurement, distribution and pricing for at least one supported managed product.

24. The method according to claim 14, further comprising providing a license manager which:
purchases a license and recovers cost based on a period of client usage, thus enabling pay-per-use pricing; and
reuses a license across different projects, wherein software usages are separated in time.

25. The method according to claim 24, wherein the license manager further:
amortizes license cost recovery across different instances when a license is reused; and
manages procurement of a licenses based on forecasted demand for a project.

* * * * *